(12) United States Patent
Loce et al.

(10) Patent No.: US 6,246,419 B1
(45) Date of Patent: Jun. 12, 2001

(54) PDL OPERATOR OVERLOADING FOR LINE WIDTH MANAGEMENT

(75) Inventors: Robert Paul Loce, Webster; Michael Branciforte, Rochester; Grace T. Brewington, Fairport; Ann Marie Cecchi, Webster, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/162,763

(22) Filed: Sep. 30, 1998

(51) Int. Cl.[7] .................................................. G06K 15/02
(52) U.S. Cl. ............................ 345/442; 345/443; 358/1.9
(58) Field of Search ..................................... 345/442, 443, 345/441, 429, 434, 431, 112; 382/266, 458, 269, 180, 173, 164, 171, 178; 101/93.09, 328; 126/692; 347/550, 12, 13, 42; 400/521, 623; 358/1.1, 1.2, 1.3, 1.9, 1.17; 348/550

(56) References Cited

U.S. PATENT DOCUMENTS

| | | | |
|---|---|---|---|
| 5,095,520 | * 3/1992 | Kim | 345/443 |
| 5,293,472 | * 3/1994 | Lotspiech | 345/443 |
| 5,542,052 | * 7/1996 | Deutsch et al. | 345/431 |
| 5,611,036 | * 3/1997 | Berend et al. | 345/441 |
| 5,831,632 | * 11/1998 | Schuster et al. | 345/441 |
| 5,872,868 | * 2/1999 | Curry | 382/266 |
| 5,977,981 | * 11/1999 | Brown | 345/429 |

* cited by examiner

*Primary Examiner*—Jeffery Brier
*Assistant Examiner*—Thu-Thao Havan
(74) *Attorney, Agent, or Firm*—Oliff & Berridge, PLC

(57) ABSTRACT

A method and apparatus for overloading operators in Page Description Language (PDL) defined graphics adjusts widths of lines in a manner that yields preferred line widths, such as to compensate for certain undesirable line growth characteristics of a target printer or display device. Line width can be controlled based on various attributes, such as color, size, width, pattern or orientation. Line width can be redefined to be wider, narrower or of a differing color to achieve a desired printed graphic. The method, performed within a decomposer, examines individual lines of a PDL defined graphic, determines if compensation is needed to achieve a desired printed output, and redefines a modification attribute to achieve the compensation.

20 Claims, 10 Drawing Sheets

1st EXEMPLARY LINE WIDTH REDEFINITION

```
%!
%*****This function finds negative lines by returning true if the         *****
%      line is black or any other color, and false if the line is white.
%*****                                                                    *****

/Xposlin {Xbl 0 gt Xye 0 gt or Xma 0 gt Xcy 0 gt or or} bind def

%*****This re-definition of the stroke operator looks for the             *****
%      case when a negative line is less than or equal to 0.25 (~2 pixels @ 600spi)
%      When found, it will increase the line width by 1 pixel.
%*****                                                                    *****

/stroke {

% define current line and line width variables currentcmykcolor /Xbl exch def /Xye exch def /Xma exch def /Xcy exch def
currentlinewidth /Xlw exch def
Xposlin %*****A positive line will require no modification {stroke}
        {currentlinewidth .25 le
                {currentlinewidth .12 add setlinewidth stroke}
                {stroke} ifelse
        } ifelse
}bind def
```

FIG. 16

| LINE COLOR | BACKGROUND COLOR | IQ EFFECT (GROWING VIA INCREASING STROKE WIDTH) | IQ EFFECT (GROWING VIA ADDING WHITE LINE) |
| --- | --- | --- | --- |
| White | Any Color | Reverse line grown properly to compensate for fill-in | Reverse line is grown properly to compensate for fill-in |
| Any Color | White | No effect, as desired | No effect, as desired |
| Non-White | Non-White | Series defect: "cookie-cutter" hole in separation fills in and line possesses color other than what was desired | Narrow white gap created on either side of line, resulting in printed line/rectangle with no visible white gap and no undesired color change at interface of line and rectangle |

*FIG. 17*

2nd EXEMPLARY LINE WIDTH REDEFINITION

```
%!
%*****This following overloaded stroke operator applies a wider white line*****
%*****beneath narrow lines                                              *****
/stroke {

%%save current color and line width %% currentcmykcolor /Xbl exch def /Xye exch def /Xma exch def
    /Xcy exch def currentlinewidth /Xlw exch def %%create a user path from current path%% false upath

%%set current color to white %%

0 0 0 0 setcmykcolor

%%then, increase the line width by a specified amount%% currentlinewidth 0.12 le %%If current ≤ 1 pixel then set white line width to 2½ pixels
    {currentlinewidth .18 add}
        {currentlinewidth .24 le %%If current>1 ≤2 then set white line width to 3 pixels
            {currentlinewidth .12 add}
                {currentlinewidth 0.36 le %%If current >2<3 then set white line width to 3½
                    {currentlinewidth .06 add}
                        {currentlinewidth} ifelse
                } ifelse
} ifelse setlinewidth stroke %%Set the original color and linewidth and stroke original path Xcy Xma Xye Xbl setcmykcolor Xlw setlinewidth ustroke }bind def
```

FIG. 18

PDL OPERATOR OVERLOADING FOR LINE WIDTH MANAGEMENT

BACKGROUND OF THE INVENTION

1. Field of Invention

The invention relates to a method and apparatus for overloading operators in Page-Description-Language (PDL) defined images to adjust widths of lines or other image attributes in a manner that yields preferred line widths or compensates for marking characteristics of a target printer or display device. More specifically, line width can be controlled based on various attributes, such as color, size, width, pattern or orientation. Line width can also be controlled to compensate for fill in of reverse-line and "cookie-cutter" holes.

2. Description of Related Art

In a network or single personal computer environment, a user may create a job representing a page to be printed having one or more sections of text, graphics and photos. Alternatively, a job may be scanned in or copied from an existing file. This job is encoded into a page description language, such as Postscript®, a trademark of Adobe Systems Inc., and sent to a printer driver for printing by a printer or other marking system or displayed on a display system, such as a monitor. Other page description languages exist, or may be developed in the coming years, and the inventive overloaded method to apply "line drawing" operators can be used in any relevant computer language or control code.

Postscript® is a programming language optimized for printing graphics or text. It provides a convenient language in which to describe images in a device independent manner. That is, the same code is used regardless of the printer or output device. Postscript® is a stack-based interpreted language. In Postscript®, you push operands onto an operand stack by naming them and then you invoke the operator to use them.

A "def" operator enters a definition into a top-most dictionary on a dictionary stack. The top operand on the operand stack is the value, and the operand below the value is the key. The "def" operator can also define new operators. An important result of a Postscript® defined image is that the elements in the procedure that describe an image are not evaluated until the procedure is invoked. Also, each operator has to be looked up each time the procedure is invoked. Unless a bind is used, evaluation of procedure components is delayed and the definition of an operator used in a procedure is the one in effect when the procedure is run, not when it was defined.

To define an image in Postscript®, the image is described by a path, which is a collection of connected or disjointed line segments and curves arranged on a page. The path does not actually describe actual ink on the paper, but rather describes an imaginary tracing over the page. Various operators allow a user to draw ink along the path, using the "stroke" operator, fill an enclosed path with ink, using the "fill" operator, or setting a paint region, using the "clip" operator.

A path is started with the "newpath" operator. The path is constructed out of line segments and curves. For simplicity, an exemplary square can be defined in Postscript® using the "moveto" operator, which defines a start point of the path, and the "lineto" operator, which adds line segments sequentially around the four corners of the square. Alternatively, a "closepath" operator can be used to close up the path with a smallest possible line segment, which in the case of a square object results in the same object path as using four "lineto" operators.

Once the path is defined, it can be drawn with the "stroke" operator. The "stroke" operator draws the image by following the path. The look of the stroke can be adjusted by another operator "setlinewidth". The "setlinewidth" operator sets the width of all lines to be stroked (drawn) to a value specified in points. In Postscript®, a point equals $1/72$ of an inch. The "setlinewidth" operator takes a single numerical argument, which is the width expressed in points, and affects all lines stroked after the "stroke" operator is invoked. The "setlinewidth" operator affects the markings placed on a page after it is called and does not affect the path until the path has been stroked or filled. As such, you cannot set the width for one part of the path and then change it to another since the path is only drawn once. The "stroke" operator is also affected by the current ink pen color, current dash pattern and other settings.

Filling a shape is achieved by creating a path as before. However, instead of calling the "stroke" operator, the "fill" operator is invoked. The "fill" operator fills the inside or outside of a closed path using current ink settings.

Typical interpreters, such as the Adobe Postscript Raster Image Processor, process data from the PDL data for subsequent printing by the printer. PDL interpreters can exist either within the printer, such as a laser printer, or can reside at an image data source, such as a personal computer or server. However, there are many instances when such conventional interpreters or other decomposing devices decompose PDL images and the resultant printed image does not portray the intended image as desired, either due to marking characteristics of the printing device or as a result of the decomposition, or due to user preference.

SUMMARY OF THE INVENTION

Image On Image (IOI) marking systems, as well as other marking systems, are known to exhibit certain undesirable line growth characteristics. For instance, thin, reverse (white) lines in a colored field may print too thin and could actually fill in completely, yielding a loss of information. In the past, efforts to control line width have been implemented in real-time digital algorithms. These include:

R. Loce, E. Dougherty "Enhancement and Restoration of Digital Documents" SPIE Press 1997;

L. Barski and R. Gaborski, "Image Character Enhancement Using a Stroke Strengthening Kernel, U.S. Pat. No. 4,791,679, Dec. 13, 1988 (ref 13 in above book);

Crawford, J. L. and C. D. Elzinga, "Improved Output Quality by Modulating Recording Power," *SPSE 41$^{st}$ Annual Conference,* May 22–26, 1988, Arlington, Va. (ref. 26 in above book);

Mailloux, L., and T. Robson, "Dilation of Image Without Resolution Conversion for Printer Characteristics," U.S. Pat. No. 5,483,351, Jan. 9, 1996 (ref. 112 in above book); and a copending patent application entitled "Method and Apparatus for Digital Darkness Control Using Quantized Fractional Pixels" (File No. D/97210).

Additionally, line width has been controlled through modification of physical marking process parameters, such as Crawford, J., and J. Cunningham, "Boldness Control in an Electrophotographic Machine," U.S. Pat. No. 5,128,698, Jul. 8, 1992 (ref. 25 in above book).

However, required window size for such filtering can be prohibitively large, requiring costly scan line buffers for many product applications. There is a need for alternative methods and apparatus for controlling line widths of a PDL defined image.

Information on conventional interpreters can be found in the Postscript Language Reference Manual Second Edition, Addison-Wesley Publishing Co., 1990, the subject matter of which is incorporated herein in its entirety by reference.

The invention provides a device that can examine determination attributes of a PDL defined graphic and redefine one or more modification attributes to redefine the graphic to achieve a printed image that more closely represents an intended image. Such a device can examine determination attributes and redefine a line width attribute to compensate for marking characteristics of an output printer.

The invention also provides a process of examining lines and overloading operators in the PDL defined graphic such that a resultant printed or displayed image is more accurate or more representative of a desired state. This can be achieved by examining a line, determining from a determination attribute that compensation of the graphic is necessary, and modifying a modification attribute of the graphic, such as line width.

BRIEF DESCRIPTION OF THE DRAWINGS

Reference will be made to the following drawings wherein like numerals refer to like elements and in which.

DETAILED DESCRIPTION OF PREFERRED EMBODIMENTS

Figure 1:
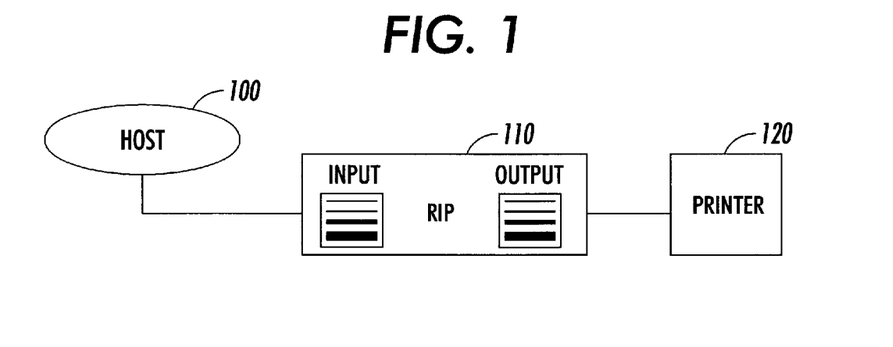
FIG. 1 is a data flow diagram illustrating a process of line width control according to the invention.
Figure 2:
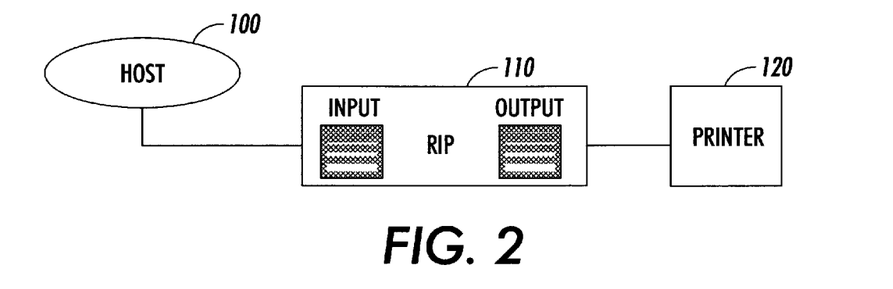
FIG. 2 is another data flow diagram illustrating a process of line width control according to the invention.
Figure 3:
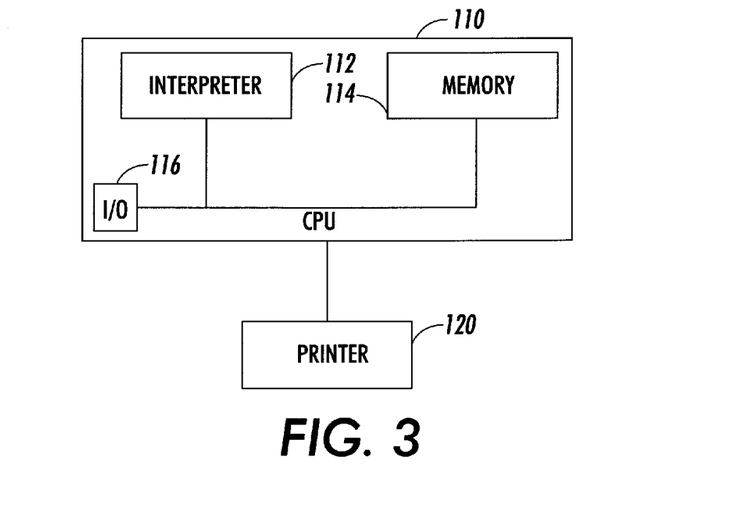
FIG. 3 is a block diagram showing a raster image processor (RIP) that processes a PDL defined image for subsequent printing by a printer according to the invention.

With reference to FIGS. 1–3, line width of a PDL defined image can be controlled by "overloading" operators that control the width of lines so that they have a different and more preferred line width upon rendering a given line. In this regard, "overloading" means that the operator will be redefined to have an alternative or expanded meaning.

With reference to FIGS. 1 and 2, in a network or single personal computer environment, a user may create a job representing a page to be printed having one or more sections of text, graphics and photos. Alternatively, a job may be scanned in or copied from an existing file. This job is encoded into a page description language, such as Postscript®, a trademark of Adobe Systems Inc., and resides at a host source 100, which may be a personal computer. The job may be sent to a printer or other marking device for printing by a printer or other marking system, or displayed on a display system, such as a monitor. However, prior to printing of the job onto a printer 120 (or displaying on an unshown display), the encoded job must be decomposed by a decomposer 110, such as a Raster Image Processor (RIP). Decomposer 110 (RIP) decomposes the job for printing on a particular printer 120.

Image On Image (IOI) marking systems (color), as well as other marking systems, are known to exhibit certain undesirable line growth characteristics. For instance, thin, reverse (white) lines in a colored field may print too thin and could actually fill in completely, yielding a loss of information. Additionally, when a color Postscript® image is processed and decomposed, a magenta line, for example, on a cyan background results in a positive line in terms of possessing color, but is negative in the cyan separation because of Postscript®'s "cookie-cutter" model which drops out cyan beneath the magenta line when the image is decomposed. Without suitable treatment, a xerographic marking could fill in the hole in the cyan separation, and the final printed line would possess an incorrect color of blue.

To correct and compensate for such situations, the "stroke" operator in Postscript® can be redefined to stroke lines at the stated width when the lines are positive and can add a certain amount onto lines when they are negative (reverse or white).

In some marking processes, the printed intensity of a line may be weak for certain thin widths. Thus, a lowered density can result in a smaller apparent width. To compensate for this apparently smaller width, the density of a line can be increased based upon its width or color by redefining the "stroke" operator to increase the width of any color line when it is below a specified width or decrease the width when above a specific width. Overloading for width adjustment can also be performed based on the input line width, color, pattern, or orientation. In addition, to prevent the "cookiecutter" fill in, a wider white line can be added under a colored line. Other operators that control object size could be overloaded in a similar manner.

FIGS. 1 and 2 show several examples of lines input into the decomposer (RIP) 110. As shown in FIG. 1, two very narrow lines and one narrow line represented in the input of the RIP (top three lines) are judged by the decomposer 110 to be too thin for proper representation when printed by printer 110. To correct this, decomposer 110 can overload one or more operators of the Page Description Language representing the lines to compensate for this so that the lines outputted from the decomposer 110 are wider. As shown, the top three lines are marginally wider when outputted. However, the decomposer 110 judges that the lowest line is of an adequate width and the overloading will not affect its width. Thus, the representation of the lower line remains unchanged. In FIG. 2, white (reverse) lines can also be compensated and adjusted if too narrow. Additionally, colored lines can have a widened white line added under the colored line to prevent fill in during marking. The lowest line is FIG. 2 illustrates a thin black line that has its output compensated to add a wider white line underneath to prevent fill in by a surrounding color.

FIG. 3 shows an exemplary configuration to achieve the line width control according to the invention. In this example, decomposer 110, which may be a general purpose computer, includes a CPU having interpreter 112 residing therein. The CPU is connected to an input/output port 116 and a memory 114. Decomposer 110 may be connected to printer 120 or host 100 through conventional cabling through the input/output port 116 of source 110, although it is most preferably located within printer 120 and internally electrically connected to a printing head of the printer through a bus line or other conventional electrical connection.

Operator overloading for Postscript® images can be performed within a Postscript® start-up file. Overloading can also be performed in the Digital Front End (DFE) code within a DFE that renders the lines. Overloading may also be achieved by adding lines of code to the Postscript® file itself.

Figure 4:
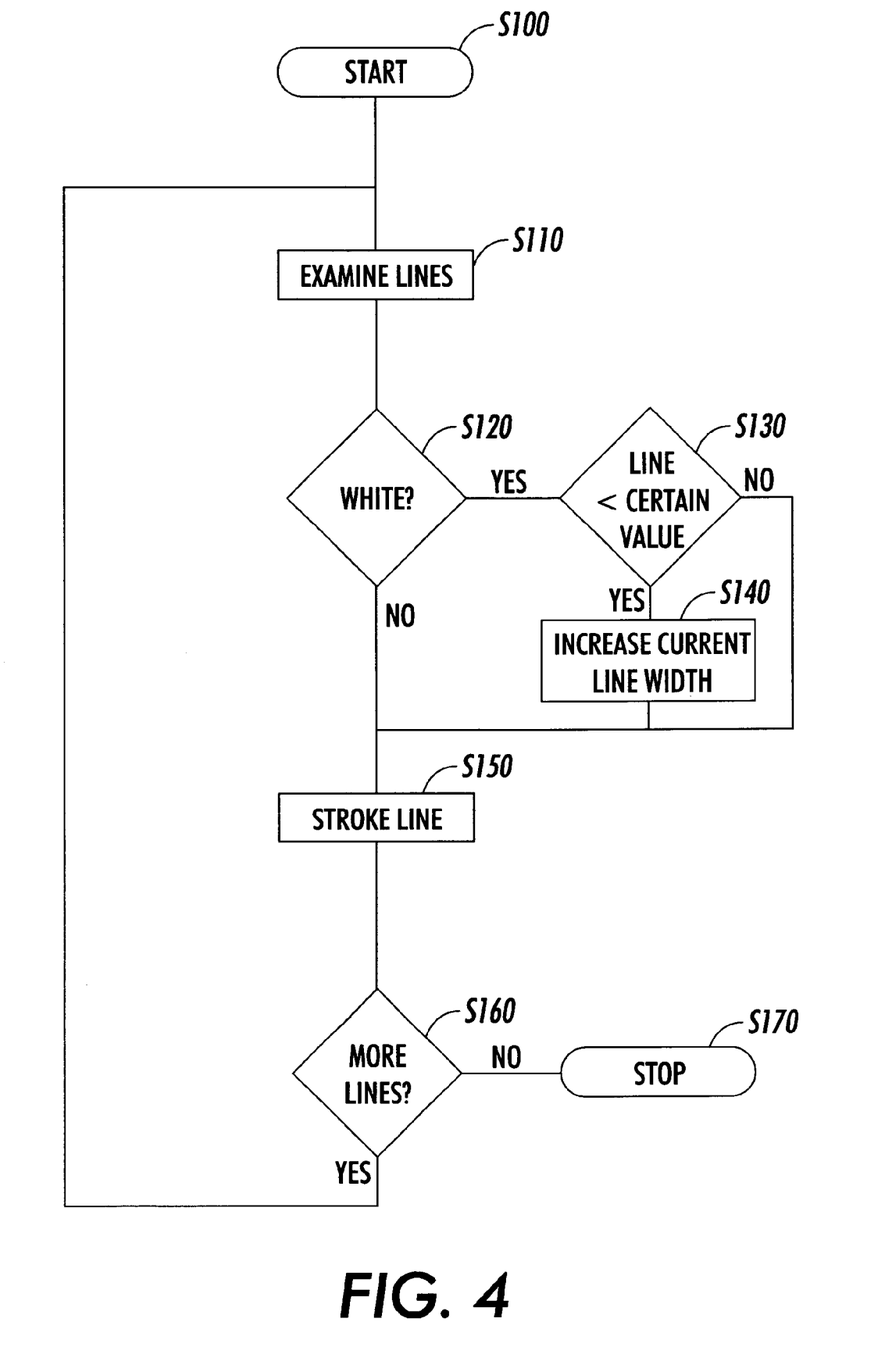
FIG. 4 is a flow diagram of a process of examining and controlling line widths of PDL defined images according to a first embodiment of the invention.
Figure 16:
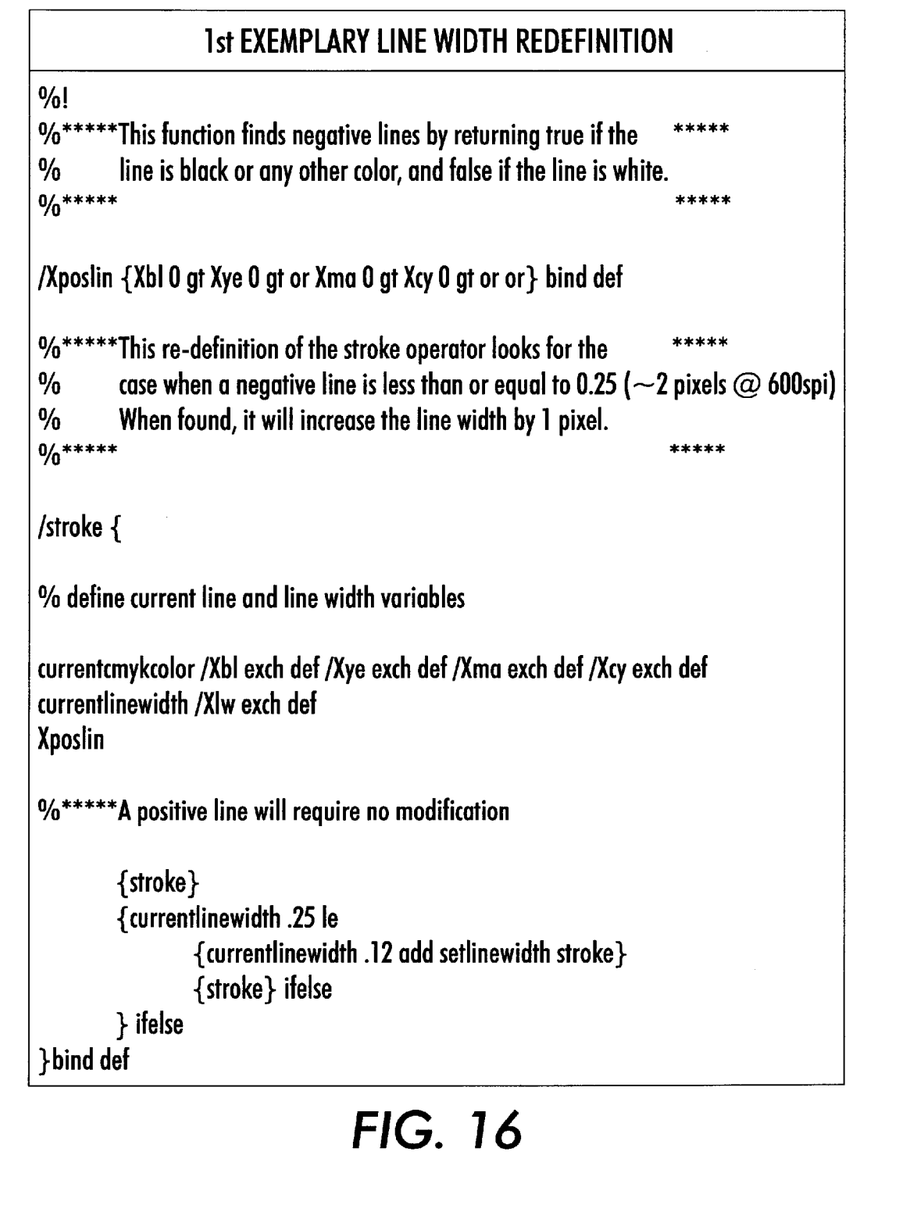
FIG. 16 shows an exemplary line width redefinition routine according to the invention.
Figure 17:
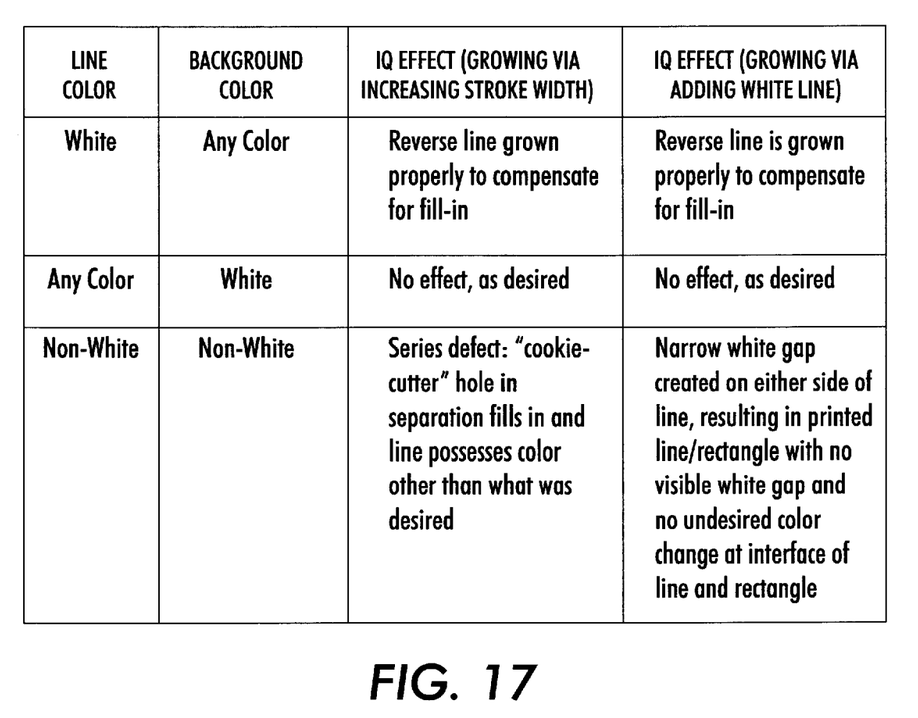
FIG. 17 is a chart showing effects of various object color combinations.

FIG. 4 is a flow chart outlining a process for adjusting line widths according to a first embodiment of the invention and corresponding to the data flow diagrams of FIGS. 1 and 2. FIG. 16 provides an exemplary line width management algorithm, written in Postscript®, that can increase the width of reverse lines that are less than or equal to two pixels in width. This specific code is customized for a resolution of 600 spi. Also, single lines are designated as 0.12 based on Postscript's default resolution of 72 spots/inch.

The process in a preferred embodiment may be performed within a Postscript startup file and begins in FIG. 4 at step S100 and continues to step S110 where lines of a PDL defined job are examined. Then, in step S120, each line is checked to see if it is negative. If the line is positive, the process jumps to step S150. However, if the line is negative, the process proceeds to step S130 where the negative line is compared with a predetermined value representing a line width in which compensation is necessary. If the process judges that the negative line is above the value, the process jumps to step S150. However, if the negative line is judged to fall below the predetermined value, the process proceeds to step S140 where the current line width is increased by a predetermined amount.

For example, in FIG. 16, lines less than or equal to about 2 pixels @600 spi are increased in width by 1 pixel. Thus, in this example, line width is an attribute serving as both a determination attribute (being compared to a threshold) and a modification attribute (as it is adjusted if necessary). However, this is not intended to be limiting and several thresholds can be provided and various compensation can be achieved. For instance, depending on the marking characteristics, the growth could be suitably "feathered" in so that abrupt width changes and different widths mapping to the same width do not occur. As an example, a 1-pixel line could be grown to 2.25 pixels, a 2-pixel line could be grown to 3 pixels and a 3 pixel line could be grown to 3.5 pixels. Moreover, determination can be made based on line color, orientation or other attributes of the graphic.

After the current line width has been increased by the process at step S140, the process proceeds to step S150 where the "stroke" operator is invoked to stroke the line at the current line width. Then, at step S160, if it is determined that additional lines are present, the process returns to step S110 and the additional lines are examined. If no more lines are present, the process stops at step S170.

Redefinition of the "stroke" command is preferred over redefinition of the "setlinewidth" command in Postscript® because the former avoids the possibility that another operation could change the line width again before applying the stroke.

Another embodiment of the invention will be described with reference to FIGS. 2 and 5–15. This embodiment is primarily concerned with compensation of reverse line fill-in in separation space.

When a Postscript® image is processed and decomposed, such as in a Raster Image Processor (RIP), a colored line, such as magenta, on a different colored nonwhite background, such as cyan, results in a positive line in terms of possessing color, but is negative in the cyan separation because of Postscript®'s "cookie-cutter" model which drops out cyan beneath the magenta line when the image is decomposed. Without suitable treatment, a xerographic marking process could fill in the hole in the cyan separation, and the final printed line would possess an incorrect color of blue.

Figure 6:
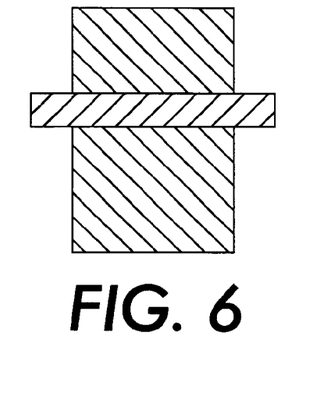
FIG. 6 is a representation of a desired multi-color composite graphical image to be printed.
Figure 7:
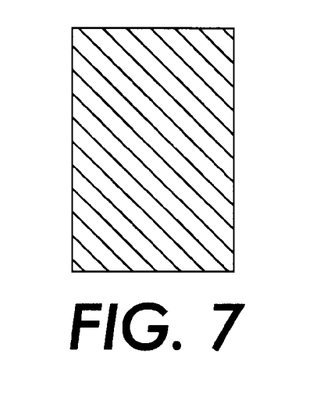
FIG. 7 is a color separation view of the rectangular underlayer shown in FIG. 6.
Figure 8:
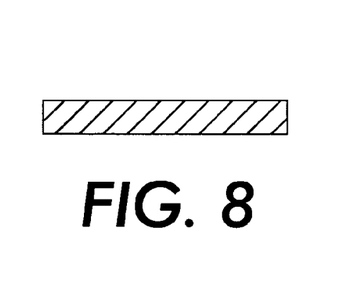
FIG. 8 is a color separation view of the thin rectangular overlayer shown in FIG. 6.

A simplified explanation of this will be described with reference to FIGS. 6–11. A desired image to be printed is shown in FIG. 6. This composite multi-colored image consists of two objects; one being a large rectangle in the background possessing the color of one marking colorant, e.g., cyan. The other object is a thin rectangle in the foreground possessing the color of a different marking colorant, e.g., magenta. These are represented by diagonal hatched lines for ease of understanding. FIGS. 7 and 8 show respective color separations for the two objects.

Figure 9:
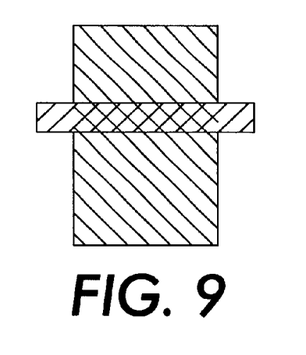
FIG. 9 shows how the desired image of FIG. 6 would appear if it were printed by an IOI printing system without any manipulation of the image.

If a printing system were to print such an image without further manipulation of the image, the resultant printed image could appear as shown in FIG. 9. As easily noticed, an undesired double marking of the overlapping portion of the thin rectangle object occurs due to a blending of the colorants when the one object is printed on top of the other object. Using cyan and magenta as examples, the resulting overlapping portion would appear as the blended color blue, whereas the desired color was actually magenta. In such multilayer systems, the final apparent color is affected by the combination of any color layers applied at the same area.

Figure 10:
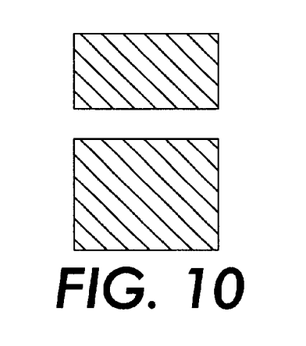
FIG. 10 shows a typical Postscript interpreter "cookie-cutter" model modified color separation of the rectangular underlayer shown in FIG. 6.

Rendering programs, such as those used in conventional Postscript® decomposers, attempt to solve such a problem by a "cookie-cutter" model of processing, in which the underlying object(s) is whited out where a portion is to be covered by a subsequent overlying object. In our example, this results in an underlying object as shown in FIG. 10. The removed portion has the same thickness as the thin line of the overlying object.

Figure 11:
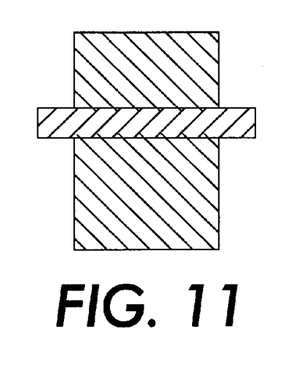
FIG. 11 shows how the desired image of FIG. 6 would appear if it were printed by an IOI printing system using the conventional "cookie-cutter" model of FIG. 10.

Applicants have recognized that with certain IOI systems and other marking systems, this cookie-cutter model can result in undesired perceived images as these systems can exhibit certain undesirable line growth characteristics. Fill in of the cookie-cutter hole can occur due to marking process characteristics and cause a blended color to be perceived rather than a desired single color. The fill in may occur from effects such as xerographic line growth or wicking of ink into a printing media such as paper, or flow of ink due to low viscosity of the ink. FIG. 11 represents such an undesirable printed image in which an area of the cookie-cutter hole has filled in and that region now forms a blended color, which is other than that desired.

In this embodiment, such a problem is overcome by overloading the "stroke" operator to write a white line beneath narrow lines or other overlying objects. The width of the white line is greater than the width of the given input line by an amount determined by a suitable line width calibration procedure. The effect is shown in FIG. 2 and FIGS. 12–15. The image quality as a result of the line compensation is summarized in Table 2.

The "cookie-cutter" defect, which is fill-in by certain marking processes, that occurs normally when a Postscript image is decomposed and both the line color and background color are non-white results in change in intended color. Processing effects for specific colored lines on specific colored backgrounds are determinable, but the various combinations are too numerous to describe and are unimportant. Suffice it to say that a non-intended color is not desirable. However, when the inventive white line addition is used, the narrow white gap that is created on either side of the line in practice, due to xerographic effects, will fill in and not be noticeable. In essence, what the inventive procedure does is open a hole around a given input line being imaged so that if it is surrounded by another color, the surrounding color will not fill in about the desired line.

Figure 12:
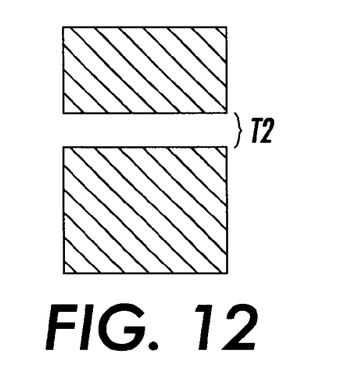
FIG. 12 shows a color separation view of the rectangular underlayer of FIG. 6 after "overloading" according to the invention.
Figure 13:
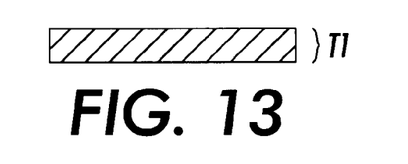
FIG. 13 shows the color separation view of the thin rectangular overlayer of FIG. 6.
Figure 14:
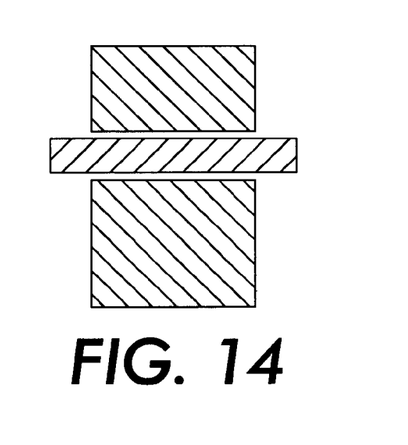
FIG. 14 shows the exact representation of the rasterized electronic image of FIG. 6 after "overloading" according to the invention as viewed with overlapping color separation views.
Figure 15:
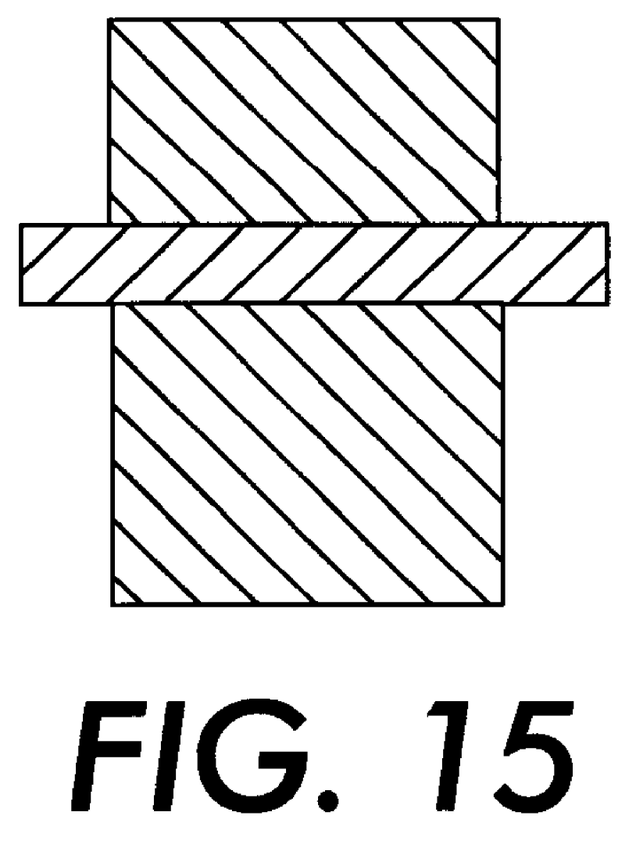
FIG. 15 shows how the desired image of FIG. 6 would appear if it were printed by an IOI printing system using the "overloading" according to the invention.

As shown in FIG. 13, an exemplary thin rectangle (over object) has a line thickness T1, as in FIG. 8. However, in the color separation representing the large rectangle (under object), a white line (reverse line) having a thickness T2, which is greater than T1 by a predetermined value, is added as shown in FIG. 12. The color separations when stacked over one another would look like that represented in FIG. 14, with a white border between adjacent regions of the multiple objects. However, an actual printed composite image would appear as shown in FIG. 15 due to the growth characteristics of the marking system. As such, by knowing the extent of growth characteristics of a particular marking system, the stroke command can be "overloaded" to compensate so that a desired image can be printed.

Figure 18:
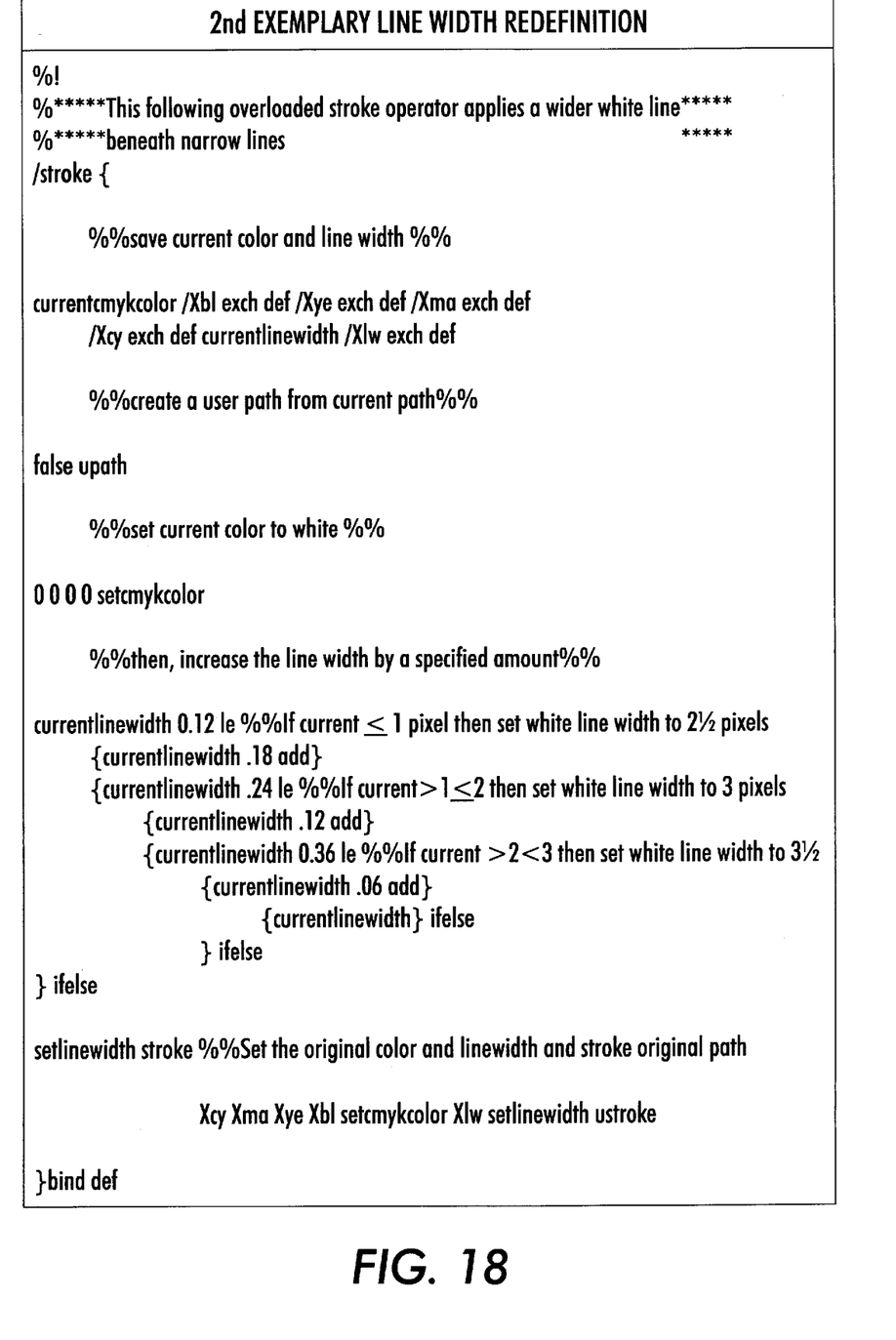
FIG. 18 shows a second exemplary line width redefinition routine according to the invention.

An exemplary line width management algorithm, written in Postscript®, that can add a white line underneath thin lines is provided in FIG. 18. In a preferred embodiment, line width management to compensate for reverse line and "cookiecutter" line fill-in uses a white line width of 2 pixels for a 1 pixel input line width, a white line width of 3 pixels for a 2 pixel input line width, and a white line width of 3 ½ pixels for an input line width of 3 pixels. As with the first embodiment, the specific code is customized for a resolution of 600 spi and single lines are designated as 0.12 based on a default Postscript® resolution of 72 spots/inch.

Figure 5:
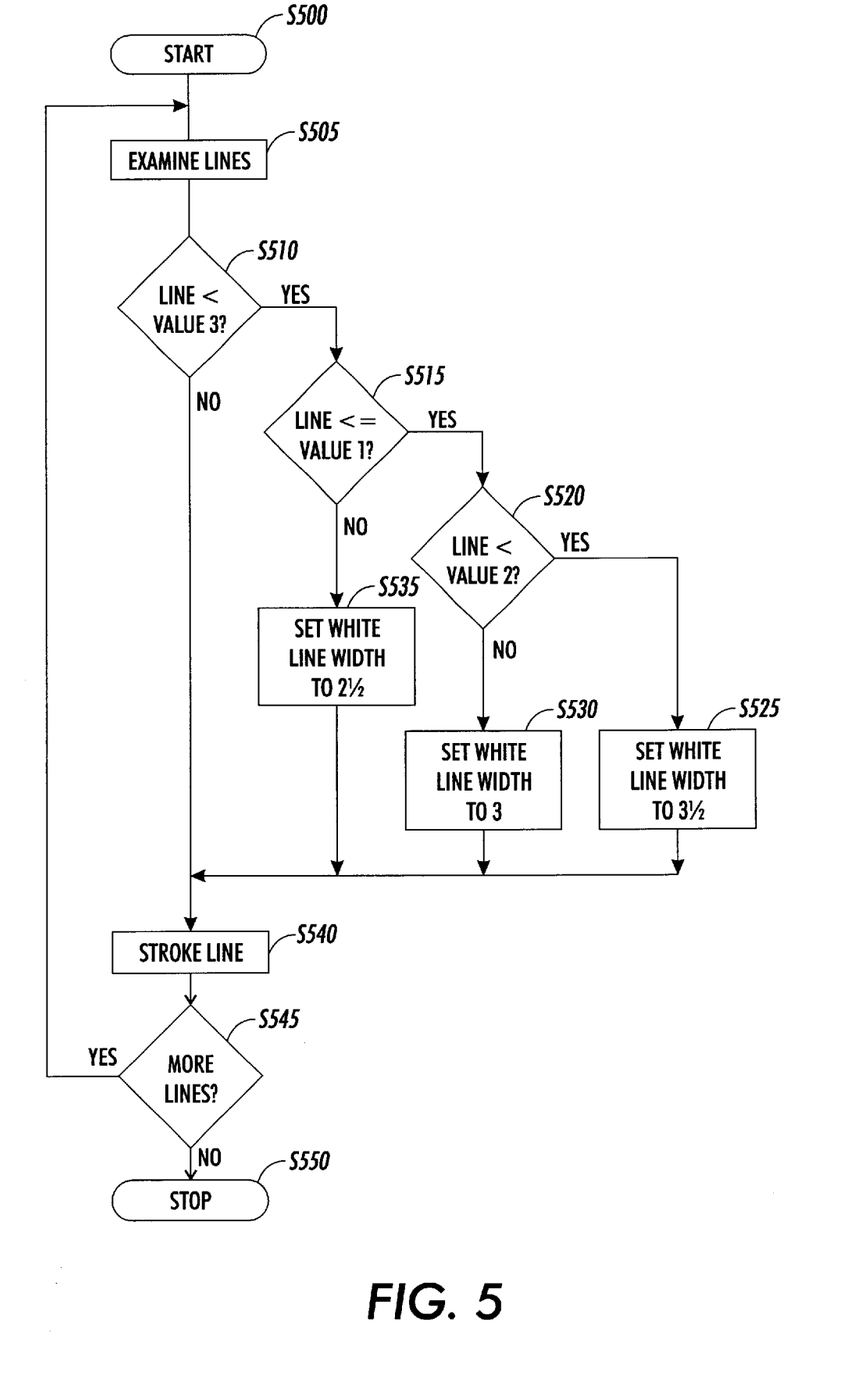
FIG. 5 is a flow diagram of a process of examining and controlling line widths of PDL defined images according to a second embodiment of the invention.

The process in a preferred second embodiment may be performed within a Postscript startup file and is described with reference to FIG. 5. The process begins at step S500 and continues to step S505 where lines of a PDL defined job are examined. Then, in step S510, each line is checked to see if it is greater than 3 pixels wide. If this determination is no, the process proceeds to step S540 as no linewidth overloading is necessary.

If, however, the line is 3 or less pixels wide, the process continues to step S515 where it is determined whether the line is <=1 pixel. If it is, the process jumps to step S535 and a white line is defined below the line and set to have a line thickness of 2½ pixels. If the line is greater than 1, the process proceeds from step S515 to step S520 where it is determined whether the line is <=2 pixels. If so, the process jumps to step S530 and a white line is defined below the line and set to have a line thickness of 3 pixels. If the line is greater than 2, the process proceeds from step S520 to step S525 where by default the line must be greater than 2 and less than 3 pixels wide. At step S525 a white line is defined below the line and set to have a line thickness of 3½ pixels.

After determination of line width, the process proceeds from steps S525, S530 or S535 to step S540 where the line is stroked. At step S545, it is determined whether more lines exist. If so, the process returns to step S505. If not, the process stops at step S550.

For example, in FIG. 18, lines less than or equal to about 1 pixel @600 spi have a white line added that is 2½ pixels wide, a 2 pixel line adds a white line of 3 pixels and a 3 pixel line adds a white line of 3½ pixels.

As with the first embodiment, redefinition of the "stroke" command is preferred over redefinition of the "setlinewidth" command in Postscript® because the former avoids the possibility that another operation could change the line width again before applying the stroke.

The Raster Image Processor (RIP) 110 is preferably implemented on a general purpose computer. However, the interpreter can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PDL, PLA, FPGA or PAL, or the like. As discussed previously, the RIP 110 can be implemented as part of printer 120.

Although the invention has been described in detail above with respect to several preferred embodiments, various modifications can be implemented without departing from the spirit and scope of the invention. For example, while primarily described with respect to a printing system, the processes are readily implemented for display of a job on a display system.

What is claimed is:

1. A method for manipulating line width of a page description language defined graphic, the graphic including a line having an attribute determinative of the need for line compensation to achieve a desired printed output, the method comprising the steps of:

examining the line;

determining from the determination attribute of the line whether compensation is required to reproduce the line by an output printer as desired;

determining marking characteristics of a desired output printer;

modifying a modification attribute of the line if the determining step determines that compensation is necessary by redefining the modification attribute so that the line width is manipulated to compensate for the determined marking characteristics of the output printer; and     outputting the graphic with the redefined modification attribute to the output printer.

2. The method of claim 1, wherein the determination attribute is line width.

3. The method of claim 1, wherein the modification attribute is line width.

4. The method of claim 1, wherein the determination attribute is selected from the group of line color, line pattern and line orientation.

5. The method of claim 1, wherein the modification attribute is selected from the group of line color, line pattern and line orientation.

6. The method of claim 1, wherein the step of modifying includes increasing a line width of the line.

7. The method of claim 1, wherein the marking characteristics include spread of colorant through ink bleed.

8. The method of claim 7, wherein the marking characteristics include low density print at thin line widths.

9. The method of claim 1, further comprising the step of outputting the graphic with the redefined modification attribute to a desired output printer.

10. A manipulating device that manipulates line width of a page description language defined graphic to compensate for printing characteristics of an output printer, the graphic including at least one line having an attribute determinative of the need for manipulation of line width, the decomposer comprising:

means within the manipulating device that examines the line of the graphic;

means within the manipulating device that determines from the determination attribute of the line whether compensation is required to reproduce the line as desired by an output printer;

means within the manipulating device that determines marking characteristics of a desired output printer;

means within the manipulating device that modifies the graphic by redefining the modification attribute so that line width of the line is manipulated to compensate for the determined marking characteristics of the output printer; and means for outputting that outputs the graphic with the redefined attribute to the output printer.

11. The manipulating device of claim 10, wherein the modification attribute is line width.

12. The manipulating device of claim 10, wherein the determination attribute is selected from the group of line color, line pattern and line orientation.

13. The manipulating device of claim 10, wherein the modification attribute is selected from the group of line color, line pattern and line orientation.

14. The manipulating device of claim 10, wherein the determination attribute is a reverse line.

15. The manipulating device of claim 14, wherein the modification attribute is line width and the line width is increased.

16. A printer including the manipulating device of claim 10.

17. A processor including the manipulating device of claim 10.

18. A method for manipulating line width of a page description language defined graphic, the graphic including a line having an attribute determinative of the need for line compensation to achieve a desired printed output, the method comprising the steps of:

examining the line;

determining from the determination attribute of the line whether compensation is required to reproduce the line by an output printer as desired, said determination attribute being a reverse line; and modifying a modification attribute of the line if the determining step determines that compensation is necessary by redefining the modification attribute so that the line is manipulated.

19. The method of claim 18, wherein the step of modifying includes increasing the line width of the line.

20. A method for manipulating line width of a page description language defined graphic, the graphic including a line having an attribute determinative of the need for line compensation to achieve a desired printed output, the method comprising the steps of:

examining the line;

determining from the determination attribute of the line whether compensation is required to reproduce the line by an output printer as desired; and modifying a modification attribute of the line if the determining step determines that compensation is necessary by redefining the modification attribute so that the line is manipulated, said step of modifying including overloading a stroke operation in the page description language to redefine the operator.

* * * * *